Sept. 6, 1955  L. A. DEMOREST  2,716,935
CULTIVATOR SHOVEL
Filed Oct. 18, 1952
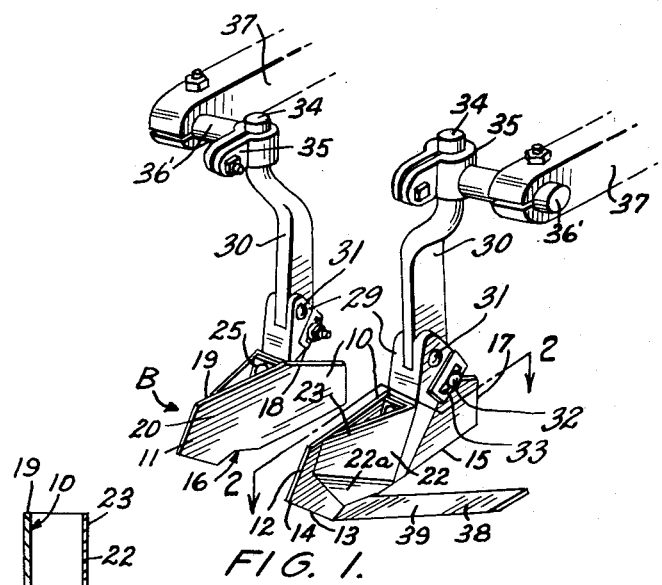
FIG. 1.
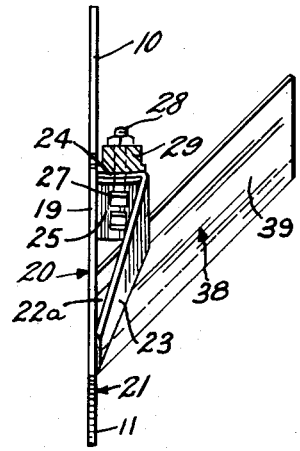
FIG. 2.
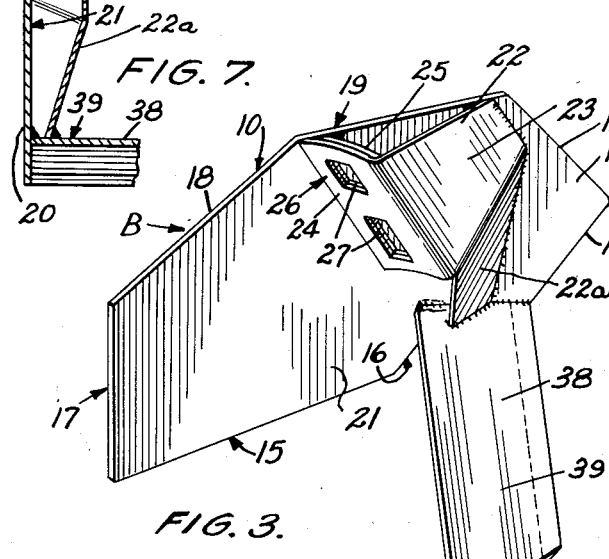
FIG. 7.
FIG. 3.
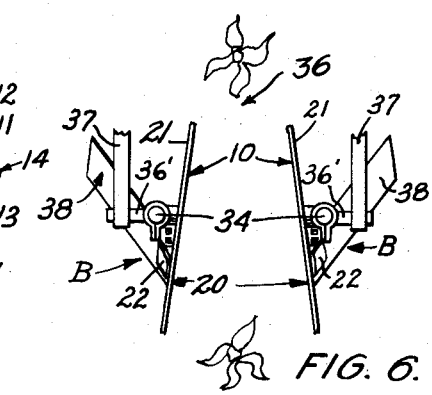
FIG. 6.
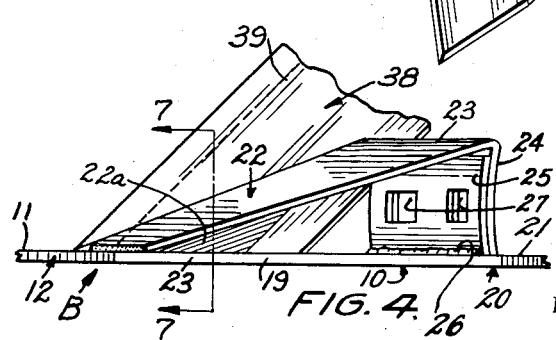
FIG. 4.
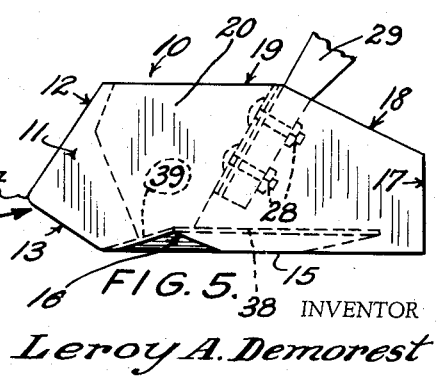
FIG. 5.
INVENTOR
Leroy A. Demorest
BY
ATTORNEY

United States Patent Office 2,716,935
Patented Sept. 6, 1955

2,716,935
CULTIVATOR SHOVEL

Leroy A. Demorest, Ashley, Ohio, assignor to Cultiguard Shovel Company, a corporation of Ohio Application October 18, 1952, Serial No. 315,563

7 Claims. (Cl. 97—204)

The present invention provides an improved soil-penetrating and working blade or shovel adapted primarily for use on tractor-operated farm cultivators.

A general object of the invention is to provide a blade or shovel capable of being readily attached to a tractor motivated cultivator frame, and wherein the construction of the blade or shovel is such as to enable the same to penetrate resisting soils with comparative ease and to maintain itself uniformly at a required distance within field soil penetrated thereby.

Another object of the invention is to provide a cultivator shovel formed to provide a novel body structure wherein is included a vertical and longitudinally disposed blade having a forwardly disposed soil-cutting nose or point, the blade being formed at one side with an angularly and laterally directed horizontally disposed wing rigidly formed therewith and projecting angularly therefrom in a manner causing the same to cut under the surfaces of the soil penetrated by the point or front end of the shovel blade.

Another object is to provide a cultivator shovel of the type defined in which the blade of the body structure has its outer longitudinally extending face provided with a soil-deflecting mounting plate forming a unitary part of the body structure, the said plate at its rear end terminating in a transversely disposed apertured web adapted for detachable connection with an associated depending frame-carried shank, the said plate being so formed and arranged on the side of the blade as to facilitate the advancement of the shovel through the soil by deflecting the penetrated soil laterally from the frame shank and thereby minimizing resistance to forward travel of the shovel.

A further object is to form the under edge of the cutting blade of such a shovel with an inwardly and upwardly directed soil-releasing recess, the latter being disposed immediately to the rear of the soil-penetrating nose of the shovel, the recess serving in conjunction with the laterally directed wing of the shovel blade to maintain the latter at a required level below the ground surface when the shovel is in operation and to facilitate soil cutting by the blade.

Other objects are to provide a cultivator shovel possessing a strong, simple and durable design; a shovel which may be economically manufactured and, finally, to provide a shovel which serves more effectively in its intended capacity than prior shovels of the same general type.

With these and other objects in view, the invention accordingly consists in the novel features of construction, combinations of elements and arrangements of parts, hereinafter more fully described and pointed out in the appended claims.

The construction disclosed in this application constitutes an improvement over that disclosed in my prior copending application, Serial No. 182,732, filed September 1, 1950, as allowed March 8, 1955, entitled Cultivator Shovel.

In the accompanying drawings, forming a part of this specification, and in which similar characters of reference denote like and corresponding parts:

Fig. 1 is a detail perspective view disclosing a pair of adjoining cultivator shovels formed in accordance with the present invention, the shovels having been shown as mounted on the lower ends of a pair of frame-carried shanks;

Fig. 2 is a horizontal sectional view taken on the plane indicated by the line 2—2 of Fig. 1, and illustrating in top plan the cultivator shovel comprising the present invention;

Fig. 3 is a perspective view of the shovel when the same is viewed from the rear thereof;

Fig. 4 is a fragmentary top plan view, on a somewhat enlarged scale, of the shovel when detached from an associated frame shank;

Fig. 5 is a side elevational view of the shovel looking toward the inner face of the blade member thereof;

Fig. 6 is a diagrammatic plan view disclosing a pair of the shovels of the present invention with the blade members thereof angularly positioned with respect to each other to produce a soil hill for the protection of the root portions of growing plants;

Fig. 7 is a transverse vertical sectional view on the line 7—7 of Fig. 4.

Referring more particularly to the drawings, and by numerals, my improved cultivator shovel comprises a rigid unitary body structure B, which in this instance embodies a vertically positioned longitudinally disposed plate-like blade 10 of steel composition. The blade is formed forwardly thereof with a nose 11 formed by being provided with upper and lower, relatively angular and reversely extending edges 12 and 13, respectively, the edges terminating adjacent to each other in a point 14.

The lower edge 13 terminates rearwardly in continuing order with the under or lower edge 15 of the blade body. This edge, immediately to the rear of the nose portion 11 of the blade, is formed with an upwardly and inwardly extending, inverted, substantially V-shaped recess 16. To the rear of the recess 16 the under edge 15 of the blade extends in a substantially horizontal plane, terminating at the rear thereof in an upwardly and perpendicularly extending rear edge 17 which, in turn, at its upper end terminates in a forwardly and angularly sloping edge 18. Uniting the edges 12 and 18 of the blade is the upper edge 19 thereof, the latter extending longitudinally and horizontally of the blade in substantial parallelism with the under edge 15. The plate includes on one side thereof a flat inner surface 20 and on its opposite side a flat outer surface 21, the surfaces 20 and 21 being disposed in parallelism.

Forming a part of the blade 10 is a stationary mounting plate shown at 22. The body of this plate has its upper portion 23 disposed, when viewed from the top, in acute angular relation to the face 21 of the blade 10, as shown more particularly in Fig. 4. At the rear thereof the angular upper portion 23 of the mounting plate terminates in an inwardly and laterally directed arcuate web 24, which may be reenforced by having the forward face thereof joined with a strap 25, the inner edges of the web 24 and the strap 25 being welded or otherwise permanently secured to the outer face 21 of the blade 10, as indicated at 26.

The web 24 and the strap 25 are formed with registering openings 27 which receive the shanks of threaded securing devices 28, the latter being employed in detachably connecting the shovel to pivoted shovel mounts 29 which are carried by the lower ends of frame shanks 30. The mounts 29 are usually pivoted as at 31 on the lower ends of the shanks 30 and are maintained in various positions of adjustment about the axis of pivots 31 by threaded binding devices 32 positioned in arcuate slots 33. The upper ends of the shanks 30 terminate in vertically disposed and laterally offset posts 34 adjustably held in clamps 35, the clamps permitting the posts to be rotated about their vertical axes and frictionally retained in such positions of adjustment so that the blades of adjoining shovels may be arranged in parallel order, or they may be placed in relatively angular relation such as that indicated in Fig. 6 of the drawings. When in such angular order soil deflected by the inner surfaces 20 of the blades produces a hill 36 around a row of growing plants. Also, the clamps 35 may be provided with side trunnions 36' which are adjustably clamped in the cultivator frame 37 for turning movement about a horizontal plane, thereby providing for additional adjustment in the operating positions of the cultivator blades.

One of the important features of the present invention is to provide the blade of the shovel body structure, on the outer side thereof and adjacent to its front lower portion, with a rigid, unitary, horizontally extending, cutter wing 38. As shown more particularly in Figs. 1 and 2 of the drawings, this wing extends laterally and angularly from the outer side 21 of the blade 10. The wing is joined rigidly at its inner end with the cutting blade at a position immediately to the rear of the lower edge 13 of the blade nose 11, and at a position between the edge 13 and the forward portion of the recess 16. Preferably, the body of the wing 38 is on a slight angle with respect to the horizontal, as indicated in dotted lines in Fig. 5. Penetrated soil traveling over the inclined upper surface 39 of the blade exerts a downward pressure which maintains the shovel at its proper working position in the soil with which it is in contact.

In view of the foregoing it will be seen that the present invention provides a cultivator shovel so designed that in the operation thereof the same is non-clogging, in that the construction is open or streamlined. The nose or point of the shovel travels adjacent the surface of the soil, separating and cutting the trash which may be present in the soil, such as corn stalks, sod, grass, or vines, the trash below being pressed down while that above the ground slides up over the shovel and causes no trouble. In hard ground, matted weeds or thistles, the shovel will not ride over the top, but penetrates the soil and cuts the matted material away. The shovel is formed from a wear-resisting steel alloy welded into one solid body-forming unit. By adjusting the shovels about the axes of the frame shanks, an operator can control the amount of soil thrown by the inner faces of the shovel blades toward adjacent rows of growing plants. The construction is an open one and provides an operator with a clear vision of the soil during the operation of cultivating. Because of its construction, the shovel also enables a cultivating operation to be performed at better than average speeds. The recess 16 in the lower edge of the blade member 10 is utilized to provide for the passage of soil therethrough, whereby to enable the nose portion 11 of the shovel to more readily penetrate resistant soils. As shown in Figs. 3 and 7, the bottom part of the plate 22 terminates in an inwardly and obliquely extending portion 22a which has its lower edge welded or otherwise rigidly joined with the forwardly and downwardly sloping upper surface 39 of the wing 38.

I claim:

1. A unitary cultivating and hilling shovel for tractor-operated farm cultivators, comprising: a rigid body structure including a vertically disposed longitudinally extending plate-like blade having flat inner and outer surfaces, said blade being formed at the front end thereof with a soil-penetrating nose, the latter including upper and lower reversely extending relatively angular edges, the diverging rear parts of the latter terminating rearwardly in the upper and lower edges of the blade body, the lower edge of the blade at the rear terminating end of the nose being formed with an upwardly and inwardly directed soil-passing recess, a soil-deflecting and mounting plate forming a component part of said body, said plate being rigid with said blade and extending angularly and rearwardly in a longitudinal direction from the outer face thereof above said recess, said plate terminating rearwardly in a perforated shank-attaching web, the latter having an inner edge joined with the outer face of the blade, and an elongated soil-penetrating cutter wing constituting a component part of the shovel body structure and formed rigidly with and projecting from the outer face of the body portion of said blade beneath said plate, the upper surface of said wing being inclined with respect to the horizontal throughout the full length thereof.

2. A cultivating and hilling shovel for tractor-operated field cultivators, comprising: a unitary body structure composed of a vertically arranged and longitudinally extending blade, the latter having flat inner and outer vertically disposed parallel surfaces, there being a soil-penetrating beveled and pointed nose extremity at the forward end of the blade, the lower edge of said blade immediately to the rear of said nose extremity being formed with an upwardly and longitudinally extending recess having reversely beveled edges; a rearwardly and angularly extending soil-cutting wing projecting rigidly and laterally outwardly from the flat outer side of said blade, said wing having the inner end thereof joined with the blade along the forward side of said recess, with the wing disposed in a plane acutely angular to the horizontal; and a mounting plate forming a rigid component part of the body structure of said shovel along with said blade and wing, said mounting plate being arranged on the flat outer surface of said blade, said plate extending outwardly and angularly in a rearward longitudinal direction from the outer surface of the blade, the forward edge of said plate being directly joined with the blade contiguous to the nose end thereof, and the rear end of said plate terminating in a laterally and inwardly directed apertured flange, said flange being adapted to be directly mounted on and attached to a depending shank of a cultivator.

3. A cultivating and hilling shovel for tractor-operated field cultivators, as defined in claim 2, and wherein the structure is further characterized by providing the mounting plate with a relatively inwardly and obliquely extending lower portion having a lower edge permanently joined to the upper surface of said wing.

4. A cultivator shovel comprising a vertically positioned flat-sided blade member terminated at the forward end thereof in a soil-penetrating extremity, said blade having parallel inner and outer surfaces, the inner surface of said blade being flat and devoid of laterally projecting soil-displacing obstructions; a mounting plate arranged on the outer surface of said blade, said plate including a relatively rearwardly and longitudinally extending soil-deflecting shield, the latter being disposed in acute angular relation to the flat outer surface of the blade with the forward portion of the shield united to the forward end of said blade at the rear of said extremity, the rear end of said plate shield terminating in an inwardly extending and laterally directed shank-receiving web, the latter being arranged substantially perpendicularly to the longitudinal plane of said blade; and an elongated substantially horizontally disposed soil-penetrating cutter wing constituting a separate component part of the shovel body, said wing being united rigidly with and projecting laterally and angularly from the outer surface of said blade member beneath said mounting plate, the upper surface of said wing being inclined with respect to the horizontal throughout the full length thereof, the forward edge of said wing being sharpened to provide a soil cutting knife edge.

5. A cultivator shovel comprising a relatively thin, flat-sided, longitudinally extending and vertically disposed blade member, said member having forward, top, bottom, and rear edges, the forward edges of said member being reversely inclined and merged intermediately of the height of the forward end of the blade member in a point to provide a soil-penetrating nose extension, the lower edge of said blade member immediately to the rear of said nose extension being formed with a recess for soil passage; an earth-cutting wing having an inner end rigidly united with and projecting horizontally and laterally from an outer vertical side surface of the blade member, said wing being joined with the blade member immediately adjacent to the forward portion of said recess and having a leading edge extending rearwardly and angularly with respect to the outer surface of said blade member; and a separate mounting plate for attaching said shovel to an associated depending cultivator frame shank, said plate being disposed on and rigidly united with the outer surface of said blade member above said wing, and formed to provide a soil-deflecting portion rigidly united at its forward region with the blade member adjacent to said nose extension, said soil-deflecting portion extending rearwardly and longitudinally of the outer side surface of the blade member in acute angular relation to the plane of the latter, the rear end of the soil-deflecting portion of said mounting plate terminating, with respect to said blade member, in an inwardly and laterally directed shank-receiving web rigidly united along its inner edge with the flat outer side surface of said blade member.

6. A cultivator shovel as defined in claim 5, and wherein the inwardly and laterally directed web of the mounting plate thereof is of arcuate configuration in cross section and is provided with a multiplicity of openings for the reception of shank fasteners.

7. A cultivator shovel as defined in claim 5, and wherein the angularly extending soil-deflecting portion of the mounting plate is extended downwardly for rigid union with said earth-cutting wing.

References Cited in the file of this patent

UNITED STATES PATENTS

| | | |
|---|---|---|
| D. 168,148 | Demorest | Nov. 11, 1952 |
| 639,275 | Oeder et al. | Dec. 19, 1899 |
| 771,530 | Card | Oct. 4, 1904 |
| 1,633,232 | Sievers | June 21, 1927 |
| 2,022,297 | Nielsen | Nov. 26, 1935 |